(12) United States Patent
Kim et al.

(10) Patent No.: US 10,802,200 B2
(45) Date of Patent: Oct. 13, 2020

(54) BACKLIGHT UNIT AND RELATED DISPLAY DEVICE

(71) Applicant: Samsung Display Co., Ltd., Yongin-Si, Gyeonggi-Do (KR)

(72) Inventors: Chang Ok Kim, Hwaseong-si (KR); Chul Min Bae, Hwaseong-si (KR); Ji Hye Han, Seoul (KR); Junghwan Yi, Hwaseong-si (KR); Shin Il Choi, Hwaseong-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/536,260

(22) Filed: Aug. 8, 2019

(65) Prior Publication Data
US 2020/0073039 A1    Mar. 5, 2020

(30) Foreign Application Priority Data

Aug. 31, 2018 (KR) .................. 10-2018-0103611

(51) Int. Cl.
*F21V 8/00* (2006.01)
*G02B 5/28* (2006.01)

(52) U.S. Cl.
CPC ............. *G02B 6/005* (2013.01); *G02B 5/283* (2013.01); *G02B 6/0088* (2013.01)

(58) Field of Classification Search
CPC .................................................. G02B 6/0088
See application file for complete search history.

(56) References Cited

U.S. PATENT DOCUMENTS

| | | | | |
|---|---|---|---|---|
| 2009/0257001 | A1* | 10/2009 | Sumida | G02B 6/0033 349/65 |
| 2012/0113672 | A1* | 5/2012 | Dubrow | B32B 5/16 362/602 |
| 2014/0319995 | A1* | 10/2014 | Kim | G02F 1/133512 313/501 |
| 2016/0109635 | A1 | 4/2016 | Lee et al. | |
| 2016/0161657 | A1* | 6/2016 | Yamada | G02F 1/1336 349/62 |
| 2017/0222095 | A1 | 8/2017 | Yamashta et al. | |
| 2017/0321116 | A1* | 11/2017 | Satake | H01L 33/501 |
| 2017/0352789 | A1 | 12/2017 | Miyanaga et al. | |

FOREIGN PATENT DOCUMENTS

| | | |
|---|---|---|
| EP | 3179524 A1 | 6/2017 |
| EP | 3240051 A1 | 11/2017 |
| JP | 2016-181474 A | 10/2016 |
| JP | 2017-027902 A | 2/2017 |
| KR | 10-2017-0041767 A | 4/2017 |
| KR | 10-2017-0118041 A | 10/2017 |

* cited by examiner

*Primary Examiner* — Alexander K Garlen
(74) *Attorney, Agent, or Firm* — Innovation Counsel LLP

(57) ABSTRACT

A backlight unit may include a light source, a light guide plate neighboring the light source, a low refractive index layer disposed on the light guide plate, a blocking layer disposed on the low refractive index layer, and a wavelength conversion layer disposed on the blocking layer and including quantum dots. A refractive index of the low refractive index layer may be less than a refractive index of the light guide plate.

15 Claims, 9 Drawing Sheets

BACKLIGHT UNIT AND RELATED DISPLAY DEVICE

CROSS-REFERENCE TO RELATED APPLICATION

This application claims priority to and the benefit of Korean Patent Application No. 10-2018-0103611 filed in the Korean Intellectual Property Office on Aug. 31, 2018; the entire contents of the Korean Patent Application are incorporated herein by reference.

BACKGROUND

(a) Technical Field

This technical field relates to a backlight unit and a display device including the backlight unit.

(b) Description of the Related Art

A typical liquid crystal display device displays an image by controlling directions/orientations of liquid crystal molecules in a liquid crystal layer to adjust transmittance of light in pixel units. A display panel of the liquid crystal display device is a non-emissive element, so the liquid crystal display device includes a backlight unit for supplying light to the display panel.

The above information disclosed in this Background section is for enhancement of understanding of the background. This Background section may contain information that does not form prior art that is already known in this country to a person of ordinary skill in the art.

SUMMARY

Embodiments may be related to a backlight unit having desirable optical characteristics and may be related to a display device including the backlight unit.

An embodiment may be related to a backlight unit. The backlight unit may include a light source, a light guide plate neighboring the light source, a low refractive index layer disposed on the light guide plate, a blocking layer disposed on the low refractive index layer, and a wavelength conversion layer disposed on the blocking layer and including quantum dots. A refractive index of the low refractive index layer may be less than a refractive index of the light guide plate.

Maximum transmittance of the blocking layer with respect to UV-B and UV-C may be less than or equal to 40%.

Maximum transmittance of the blocking layer for UV-C may be less than or equal to 20%.

The blocking layer may include a metal oxide.

The metal oxide may include at least one of an indium oxide, a zinc oxide, a zirconium oxide, an indium-zinc oxide, an indium-tin oxide, an indium-gallium-zinc oxide, an indium-tin-zinc oxide, and indium-tin-gallium-zinc oxide.

Minimum transmittance of the blocking layer may be at least 70% for blue light having a wavelength in a range of 440 nm to 485 nm.

Transmittance of the blocking layer may be at least 80% for light having a wavelength of 447 nm.

The backlight unit may include a first capping layer disposed between the blocking layer and the wavelength conversion layer. The first capping layer may include a first inorganic material.

The backlight unit may include a second capping layer. The wavelength conversion layer may be disposed between the first capping layer and the second capping layer. The second capping layer may include at least one of the first inorganic material and a second inorganic material.

The backlight unit may include an overcoat layer disposed on the second capping layer. The overcoat layer may include an organic material.

The blocking layer may directly contact the wavelength conversion layer.

An embodiment may be related to a backlight unit. The backlight unit may include the following elements: a light source; a light guide plate neighboring the light source; a low refractive index layer disposed on the light guide plate, wherein a refractive index of the low refractive index layer may be less than a refractive index of the light guide plate; a first capping layer disposed on the low refractive index layer and including a first silicon nitride layer; and a wavelength conversion layer disposed on the first capping layer and including quantum dots.

The first capping layer may include a second silicon nitride layer overlapping the first silicon nitride layer.

The first silicon nitride layer may be denser than the second silicon nitride layer and may be disposed between the light guide plate and the second silicon nitride layer.

The first capping layer may include a material layer formed of a material different from silicon nitride.

The low refractive index layer and the wavelength conversion layer each may include an organic material. The first capping layer may include an inorganic material.

An embodiment may be related to a backlight unit. The display device may include the following elements: a display panel; a light source; a light guide plate overlapping the display panel and neighboring the light source; a low refractive index layer disposed on the light guide plate, wherein a refractive index of the low refractive index layer may be less than a refractive index of the light guide plate; a blocking layer disposed on the low refractive index layer, wherein maximum transmittance of the blocking layer with respect to UV-B and UV-C may be less than or equal to 40%; and a wavelength conversion layer disposed on the blocking layer and including quantum dots.

Maximum transmittance of the blocking layer for UV-C may be less than or equal to 20%.

Minimum transmittance of the blocking layer may be at least 70% for blue light having a wavelength in a range of 440 nm to 485 nm.

The blocking layer includes a metal oxide.

The display device may further include a capping layer disposed between the blocking layer and the wavelength conversion layer.

An embodiment may be related to an optical member. The optical member may include the following elements: a glass light guide plate; a low refractive index layer disposed on the glass light guide plate, wherein a refractive index of the low refractive index layer may be lower than a refractive index of the glass light guide plate; a transparent conductive oxide layer disposed on the low refractive index layer; and a wavelength conversion layer disposed on the transparent conductive oxide layer and including quantum dots.

The optical member may include an inorganic material layer disposed between the transparent conductive oxide layer and the wavelength conversion layer.

According to embodiments, a backlight unit and a related display device may have desirable optical characteristics. For example, an optical member of the backlight unit may provide substantially consistent luminance over time.

DETAILED DESCRIPTION OF EMBODIMENTS

Figure 1:
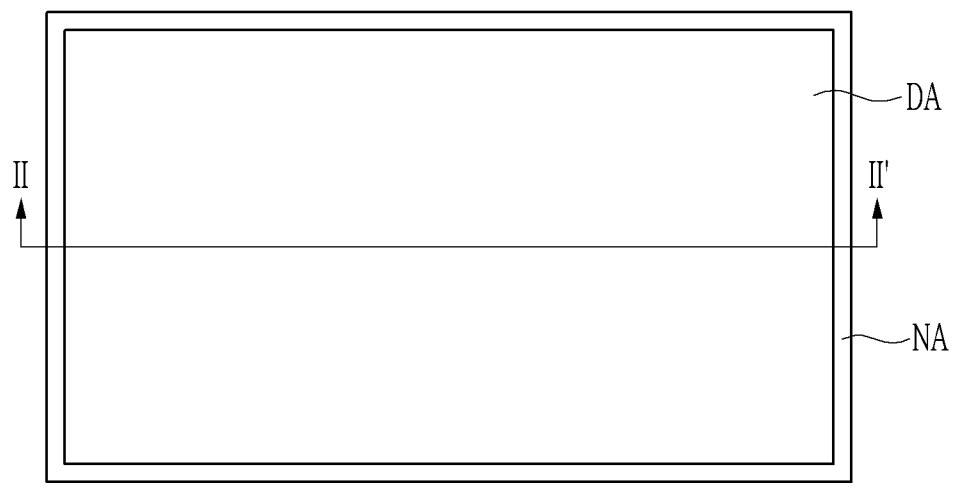
FIG. 1 illustrates a schematic plan view of a display device according to an embodiment.

Example embodiments are described with reference to the accompanying drawings. The described embodiments may be modified in various ways, all without departing from the spirit or scope of the present disclosure.

Like reference numerals may designate like elements in the specification.

In the drawings, thicknesses of layers, films, panels, regions, etc., may be exaggerated for clarity.

Although the terms "first," "second," etc. may be used herein to describe various elements, these elements, should not be limited by these terms. These terms may be used to distinguish one element from another element. Thus, a first element may be termed a second element without departing from teachings of one or more embodiments. The description of an element as a "first" element may not require or imply the presence of a second element or other elements. The terms "first," "second," etc. may also be used herein to differentiate different categories or sets of elements. For conciseness, the terms "first," "second," etc. may represent "first-type (or first-set)," "second-type (or second-set)," etc., respectively.

When a first element is referred to as being "on" a second element, the first element can be directly on the second element, or one or more intervening elements may be present between the first element and the second element. When a first element is referred to as being "directly on" a second element, there are no intended intervening elements (except environmental elements such as air) present between the first element and the second element.

Unless explicitly described to the contrary, the word "comprise" and variations such as "comprises" or "comprising" may indicate inclusion of stated elements but not exclusion of any other elements.

Figure 2:
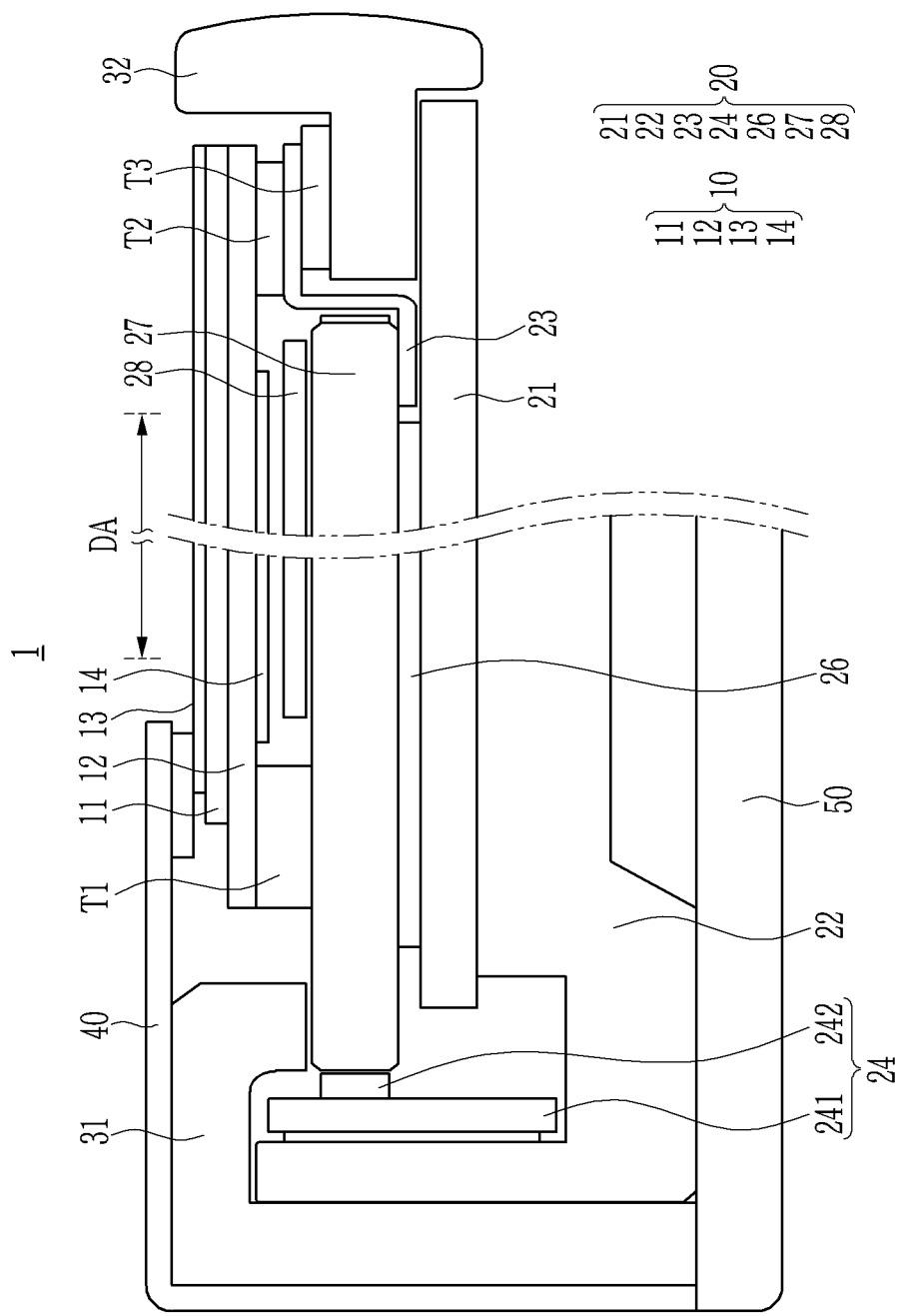
FIG. 2 illustrates a cross-sectional view taken along line II-II' of FIG. 1 according to an embodiment.

FIG. 1 illustrates a schematic plan view of a display device according to an embodiment, and FIG. 2 illustrates a cross-sectional view taken along line II-II' of FIG. 1 according to an embodiment.

Referring to FIG. 1, the display device 1 may be substantially rectangular. A display area DA in which an image is to be displayed in the display device 1 occupies most of a front area of the display device 1, and a non-display area NA surrounds the display area DA. The display area DA may be called a screen, and the non-display area NA may correspond to a bezel. Although the display device 1 and the display area DA are shown with four angular corners, the corners may be rounded.

FIG. 2 illustrates a cross-section of the display device 1 of FIG. 1 taken along a transverse direction. Referring to FIG. 2, a light source unit 24 is disposed at one edge of the display device 1. An edge portion of (an optical member 27 of) the display device 1 where the light source unit 24 is disposed is referred to as a light-incident portion, and an edge portion of (the optical member 27 of) the display device 1 opposite the light-incident portion where the light source unit 24 is not disposed is referred to as a light-facing portion. The light source unit 24 may be disposed at one or more edges of the display device 1.

Referring to FIG. 1 and FIG. 2, the display device 1 basically includes a display panel 10 and a backlight unit 20. The display device 1 includes frames 31 and 32 for fixing the display panel 10 to the backlight unit 20. The display device 1 includes a top chassis 40 that may cover edges of the display panel 10 to protect the display panel 10 and prevent the display panel 10 from being separated from the backlight unit 20. The top chassis 40 may be disposed only at the edge of the display device 1 where the light source unit 24 is disposed, or may be disposed around the display device 1. A back cover 50 covering a driving device for operating the display device 1, a power supply unit, and the like is disposed on the rear surface of the backlight unit 20.

The display panel 10 is a liquid crystal display panel in which a liquid crystal layer is formed between two transparent substrates 11 and 12 formed with switching elements, electrodes, color filters, and other components, and polarizers 13 and 14 are attached to surfaces of the substrates 11 and 12. The display panel 10 displays an image by adjusting transmittance of light that is provided by the backlight unit 20 to pass through the polarizing plates 13 and 14 and the liquid crystal layer under control of the driving device.

The backlight unit 20 for supplying light to the display panel 10 is disposed below the display panel 10. The backlight unit 20 includes a bottom chassis 21, a support 22, a bracket 23, the light source unit 24, and optical elements 26 and 27.

The bottom chassis 21 is a container in which components of the backlight unit 20 are disposed or fixed. The bottom chassis 21 may have a substantially rectangular tray-like shape. The bottom chassis 21 may be made of a metal material such as aluminum, an aluminum alloy, or galvanized steel. The bottom chassis 21 may be made of a plastic material such as polycarbonate.

The optical elements including a reflective sheet 26, an optical member 27, and an optical sheet 28 are disposed above/on the bottom chassis 21. The support 22 to which the light source unit 24 is coupled is disposed on a back surface of the bottom chassis 21 in the light-incident portion. The bracket 23 for supporting the optical member 27 is positioned on the bottom chassis 21 in the light-facing portion.

The support 22 is a heat dissipation component for fixing the light source unit 24 and for transmitting heat generated by the light source unit 24 to the bottom chassis 21. The support 22 may be made of a metal material having good thermal conductivity in order to quickly transmit the heat from the light source unit 24 to the bottom chassis 21 to prevent the light source unit 24 from overheating. For example, the support 22 may be formed by extrusion molding with aluminum, an aluminum alloy, or the like.

The light source unit 24 includes a substrate 241 that is disposed along the light-incident portion, and light sources 242 that are disposed at predetermined intervals on the substrate 241. The substrate 241 may be a printed circuit board (PCB), and particularly, may be a metal core printed circuit board (MCPCB). The substrate 241 may be fixed to the support 22. The light source 242 is electrically connected to a wire of the substrate 241, and receives power, converts electrical energy into light energy, and emits it. The light source 242 may be a light emitting diode (LED) package, and the LED may emit blue light of high color purity. The blue light may mean light with a wavelength in a range of about 440 nm to 485 nm. The LED may emit, for example, blue light having a peak wavelength in a range of 445 nm to 450 nm, and particularly, may emit blue light having a peak wavelength of 447 nm. The light source 242 faces the optical member 27 and is configured to emit light toward the optical member 27. In addition to or alternative to the LED package, a point light source or a line light source may be used as a light source 242.

One edge of the optical member 27 is adjacent to the light source 242. The optical member 27 guides light emitted from the light source 242 to transmit the light to the display panel 10. The optical member 27 serves to substantially evenly distribute the light received from the light source unit 24. The optical member 27 also serves to convert a wavelength of the light emitted from the light source 242. The optical member 27 may be larger than the display area DA in a plan view of the display device 1, to be able to provide light to all of the display area DA of the display device 1. The optical member 27 may be provided as an integral part.

The reflective sheet 26 may be disposed under the optical member 27 and may be between the optical member 27 and the bottom chassis 21. The reflective sheet 26 reflects light toward the display panel 10, thereby enhancing light efficiency.

The optical sheet 28 may be disposed on the optical member 27. The optical sheet 28 may include one or more of a diffusion sheet, a prism sheet, and a protective sheet. The diffusion sheet is used to scatter light emitted from the optical member 27 to make luminance distribution uniform. The prism sheet adjusts a traveling direction of light diffused by the diffusion sheet to be perpendicular to the display panel 10. The protective sheet may protect prisms of the prism sheet from scratches and the like. The protective sheet may diffuse light to widen a viewing angle that is narrowed by the prism sheet. The optical sheet 28 may further include a reflective polarizing sheet capable of enhancing luminance efficiency by separating, transmitting, and reflecting a polarized light component of light.

In the frames 31 and 32, the frame 31 disposed at the light-incident portion may be structurally different from the frame 32 disposed at the light-facing portion. The display panel 10 may be fixedly attached to the optical member 27 and the bracket 23 by adhesive members T1 and T2 such as double-sided adhesive tapes. The bracket 23 may be attached to the frame 32 by the adhesive member T3. With the above-described structures, the display device 1 may be desirably thin.

Figure 3:
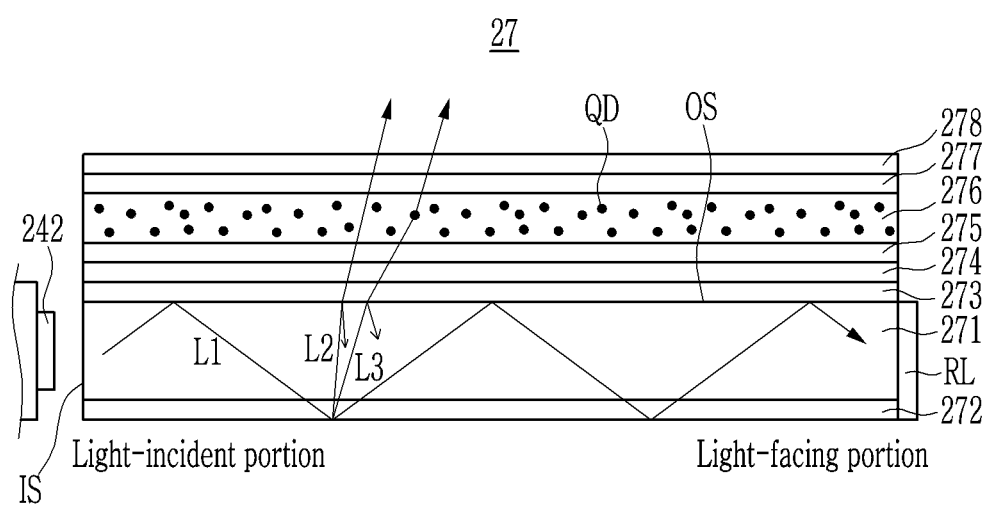
FIG. 3 illustrates a cross-sectional view of a backlight unit including an optical member according to an embodiment.
Figure 4:
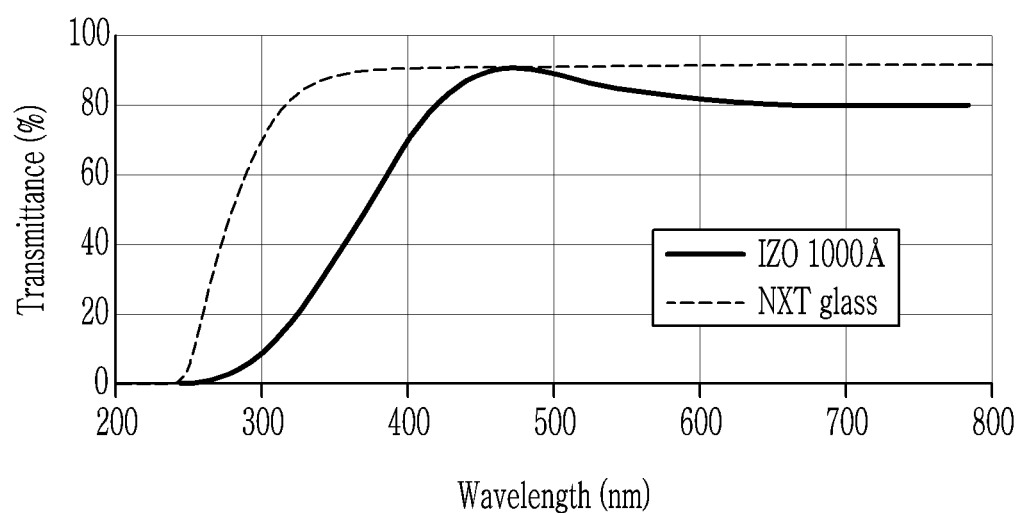
FIG. 4 illustrates a graph of transmittance values of an indium-zinc oxide layer according to an embodiment.

FIG. 3 illustrates a cross-sectional view of an optical member according to an embodiment, and FIG. 4 illustrates a graph of transmittance values of an indium-zinc oxide layer. In FIG. 3, the light source 242 together with the optical member 27 is illustrated to show a relationship between the optical member 27 and the light source 242.

Referring to FIG. 3, the optical member 27 includes a light guide plate 271 as a main element for supplying light received from the light source 242 to the display panel 10. An edge portion of the light guide plate 271 that is adjacent to the light source 242 is referred to as a light-incident portion, and an edge portion of the light guide plate 271 that is far from the light source 242 and opposite the light-incident portion is referred to as a light-facing portion. The optical member 27 also includes a low refractive index layer 273, a blocking layer 274, a first capping layer 275, a wavelength conversion layer 276, a second capping layer 277, and an overcoat layer 278 sequentially stacked on the light guide plate 271.

The light guide plate 271 guides light emitted from the light source 242. The light guide plate 271 may be a glass light guide plate. The glass light guide plate is less prone to deformation potentially caused by heat and moisture than a plastic light guide plate made of polymethyl methacrylate (PMMA), and has high strength. The glass light guide plate may facilitate design and thickness minimization of the backlight unit 20. A glass material of the light guide plate 271 may be silica-based glass, and may include one or more of a silicon dioxide ($SiO_2$), an aluminum oxide ($Al_2O_3$), and the like. The light guide plate 271 may have a thickness in a range of about 0.5 mm to about 3 mm, but it may be smaller than 0.5 mm or greater than 3 mm.

A pattern sheet 272 is disposed under the light guide plate 271, and the low refractive index layer 273 having a lower refractive index than that of the light guide plate 271 is disposed on the light guide plate 271. A refractive index of the pattern sheet 272 may be the same as that of the light guide plate 271. The low refractive index layer 273 is made of a material having a lower refractive index than that of a material forming the light guide plate 271. The low refractive index layer 273 may be made of an organic material such as acrylic resin, polystyrene, polycarbonate, polyethylene terephthalate, or polyacrylonitrile, and may be coated on an upper surface of the light guide plate 271. Particles such as hollow silica may be dispersed in a resin of the low refractive index layer 273.

A first interface for different refractive indices is formed between the low refractive index layer 273 and the light guide plate 271. The first interface corresponds to a light-facing surface OS of the light guide plate 271, and functions as an interface for selectively passing light L1 guided in the light guide plate 271. That is, when an incident angle to the light-facing surface OS of the light L1 guided in the light guide plate 271 is equal to or greater than the total reflection critical angle, the light L1 is totally reflected at the first interface and returned to the light guide plate 271. On the other hand, when incident angles to the light-facing surface OS of light L2 and L3 guided in the light guide plate 271 are less than the total reflection critical angle, at least a part of the light L2 and L3 passes through the first interface and exits the light guide plate 271.

There is air below the pattern sheet 272, and a second interface for different refractive indices is formed between the pattern sheet 272 and the air. A pattern of the pattern sheet 272 adjusts a reflection angle of the light L1 guided in the light guide plate 271 to allow at least a part of the light L2 and L3 reflected or scattered by the second interface to not be totally reflected at the first interface and to exit from the light guide plate 271.

The light L1 incident on the light incident surface IS of the light guide plate 271 is guided in the light guide plate 271 from the light-incident portion to the light-facing portion, and exits through the entire light-facing surface OS of the light guide plate 271. Therefore, the light guide plate 271 converts the light received from the point or linear light source 242 into substantially evenly distributed light. A reflective layer RL may cover a lateral surface of the light-facing portion of the light guide plate 271 so that the light guided in the light guide plate 271 does not pass through the lateral surface of the light-facing portion of the light guide plate 271. The pattern sheet 272 may be unnecessary, and a lower surface of the light guide plate 271 may be patterned.

The blocking layer 274 is disposed on the low refractive index layer 273. The blocking layer 274 serves to block at least a part of ultraviolet rays, which may occur in a process of forming the first capping layer 275, from entering the light guide plate 271. The blocking layer 274 may have maximum transmittance for ultraviolet light of about 70% or less. The maximum transmittance is for a defined wavelength region/range (for example, an ultraviolet wavelength region). According to the International Lighting Commission (CIE), ultraviolet light is classified into LTV-A in a range of 315 nm to 380 nm, UV-B in a range of 280 nm to 315 nm, and UV-C in a range of 100 nm to 280 nm. In embodiments, the blocking layer 274 may have a high blocking rate (i.e., low transmittance) for each of UV-B and LTV-C. For example, the blocking layer 274 may have a maximum transmittance for UV-B (and UV-C) of about 40% or less, about 30% or less, or about 20% or less. The blocking layer 274 may have a maximum transmittance for UV-C of about 20% or less, about 15% or less, or about 10% or less. The blocking layer 274 may have transmittance for a wavelength of 300 nm of 10% or less.

When ultraviolet rays, particularly UV-B and UV-C, are irradiated on the light guide plate 271, optical characteristics of the light guide plate 271, particularly transparency with respect to blue light of the light guide plate 271, may be reduced. Impurities such as an iron oxide ($FeO_x$) and a manganese oxide ($MnO_x$) may be included in the light guide plate 271; when the impurities are exposed to ultraviolet rays, their phases are changed such that an absorption rate of a specific wavelength band such as blue light may increase. The phase change of the impurities due to ultraviolet rays increases an extinction coefficient of the glass to lower light guide luminance; as a result, light guide luminance of the blue light may be lowered. When the light guide plate 271 with lowered transparency receives heat, particularly, heat emitted from the light source 242, phases of the impurities may be changed to original phases to gradually restore the original transparency of the light guide plate 271. If the first capping layer 275 is formed without presence of the blocking layer 274, initial luminance of the light-facing portion of the light guide plate 271 may be undesirably low, and the transparency of the light guide plate 271 may increase with time because of the heat from the light source 242. Such changes in the transparency of the light guide plate 271 caused by a change in a redox state of impurities such as iron (Fe) in the glass, ultraviolet rays, and heat may be undesirable.

The blocking layer 274 may prevent blue light transparency of the light guide plate 271 from lowering by blocking ultraviolet rays when the first capping layer 275 is formed, and therefore may prevent blue light transparency of the light guide plate 271 from increasing with time after use. Advantageously, the quality and performance of the light guide plate 271 may be substantially consistent. According to test results, both UV-B and UV-C significantly affect transparency degradation of the light guide plate 271, a short wavelength of UV-C largely affects it, and UV-A hardly affects it.

The blocking layer 274 has high transmittance with respect to visible light so that light emitted from the light-facing surface OS of the light guide plate 271 may travel to and emit from an upper surface of the optical member 27. The blocking layer 274 may have minimum transmittance of about 70% or more, about 75% or more, or about 80% or more for visible light, especially for blue light. The minimum transmittance is for a defined wavelength region/range (for example, a blue light wavelength region). The reason why the transmittance with respect to blue light is high is because the light emitted through the light-facing surface OS of the light guide plate 271 is also blue light when the light source 242 emits blue light. The transmittance of the blocking layer 274 for a wavelength of 447 nm (in a blue light range) may be 80% or more.

The blocking layer 274 having the above-described optical characteristics may be formed by depositing a transparent conductive oxide (TCO) on the low refractive index layer 273 by sputtering and/or a different deposition process. Referring to FIG. 4, a graph of transmittance values of an indium-zinc oxide layer having a thickness of 1000 Å is shown. The indium-zinc oxide layer has low transmittance in the ultraviolet region, while it has high transmittance in the visible region. In particular, it has a low transmittance with respect to UV-B and UV-C: its transmittance at a wavelength of about 300 nm is about 10%, its transmittance at a wavelength of about 280 nm is nearly 0%, and its transmittance at shorter wavelengths is 0%. In addition, its transmittance for the blue light region in the visible light region is high, and the transmittance for a wavelength of 447 nm exceeds 85%. A transparent conductive oxide such as indium-zinc oxide (IZO) has a high blocking ratio for UV-C and high transmittance for blue light, so that it is suitable as the material of the blocking layer 274. The blocking layer 274 may be formed of one or more metal oxides such as one or more of indium oxide ($InO_x$), zinc oxide ($ZnO_x$), zirconium oxide ($ZrO_x$), indium-tin oxide (ITO), indium-gallium-zinc oxide (IGZO), indium-tin-zinc oxide (ITZO), and indium-tin-gallium-zinc oxide (ITGZO), in addition to or alternative to indium-zinc oxide (IZO). A blocking layer 274 formed of at least one of these metal oxides has a high blocking ratio in the UV-B and UV-C regions and high transmittance in the blue light region. For reference, a graph shown by a dashed line in FIG. 4 shows high transmittance values of Lotus™ NXT Glass of Corning that are 90% or more in the entire visible light region.

The blocking layer 274 may have a thickness in a range of about 200 Å to about 2000 Å. If the blocking layer 274 is to thin, its ultraviolet blocking ratio may be insufficient; if the thickness of the blocking layer 274 to thick, the optical member 27 may be unnecessarily thick, and manufacturing time and cost may be wasted. In embodiments, the blocking layer 274 may have a thickness of less than 200 Å or a thickness of more than 2000 Å, for example, in a range of about 100 Å to about 10,000 Å. For reference, Table 1 shows transmittance simulations for a wavelength of 260 nm depending on thickness values of an indium-zinc oxide (IZO) layer.

As shown in Table 1, the transmittance of the IZO layer gradually decreases as the thickness of the IZO layer increases, and the IZO layer has transmittance of 0.75% at a thickness of 1000 Å. The metal oxide block layer having a relatively thin thickness is sufficient effective for blocking ultraviolet rays.

TABLE 1

| IZO thickness (Å) | 200 | 300 | 400 | 500 | 600 | 700 | 800 | 900 | 1000 |
|---|---|---|---|---|---|---|---|---|---|
| 260 nm transmittance (%) | 8.10 | 5.81 | 4.68 | 3.87 | 3.04 | 2.25 | 1.66 | 1.26 | 0.75 |

The first capping layer 275 and the wavelength conversion layer 276 are disposed on the blocking layer 274. The first capping layer 275 is disposed between the wavelength conversion layer 276 and the low refractive index layer 273 to prevent an organic material of the wavelength conversion layer 276 and an organic material of the low refractive index layer 273 from being mixed. The first capping layer 275 may block moisture or oxygen from penetrating into the wavelength conversion layer 276. The first capping layer 275 may be formed by depositing an inorganic material such as a silicon nitride ($SiN_x$) and/or a silicon oxide ($SiO_x$) through plasma-enhanced chemical vapor deposition (PECVD). In the PECVD process, ultraviolet rays occur, and the ultraviolet rays, particularly UV-B and UV-C, may deteriorate the optical characteristics of the light guide plate 271 if the blocking layer 274 is not implemented. Since the blocking layer 274 covers the light guide plate 271 before the first capping layer 275 is formed, the light guide plate 271 may be protected from ultraviolet rays generated from the plasma when the first capping layer 275 is formed.

The wavelength conversion layer 276 is disposed on the first capping layer 275. The wavelength conversion layer 276 may be formed by coating a composition on the first capping layer 275. The composition may include quantum dots QD dispersed in a dispersion medium such as a resin. Therefore, the wavelength conversion layer 276 may include the quantum dots QD dispersed in a resin layer. The dispersion medium may be formed of a transparent material having low light absorptivity without affecting the wavelength conversion performance of the quantum dots QD. The transparent material may include, for example, one or more of epoxy, silicone, polystyrene, and acrylate.

When the light emitted from the light source 242 is blue light, the quantum dots QD of the wavelength conversion layer 276 may include red quantum dots and green quantum dots. A red quantum dot converts part of the blue light into red light having a wavelength in a range of 620 nm to 750 nm, and a green quantum dot converts part of the blue light into green light having a wavelength in a range of 495 nm to 570 nm. Part of the blue light that is not converted into red light or green light passes through the wavelength conversion layer 276 as it is. The optical member 27 may provide white light to the display panel 10, wherein the white light is a mixture of the blue light, the red light, and the green light provided by the wavelength conversion layer 276.

The second capping layer 277 is disposed on the wavelength conversion layer 276, and the overcoat layer 278 is disposed on the second capping layer 277. The second capping layer 277 may be made of an inorganic material such as a silicon nitride and/or a silicon oxide, and the overcoat layer 278 may be made of an organic material. The second capping layer 277 serves to prevent an organic material of the wavelength conversion layer 276 from mixing with an organic material of the overcoat layer 278. The second capping layer 277 may block moisture or oxygen. The overcoat layer 278 serves to protect the optical member 27 as a whole.

Figure 5:
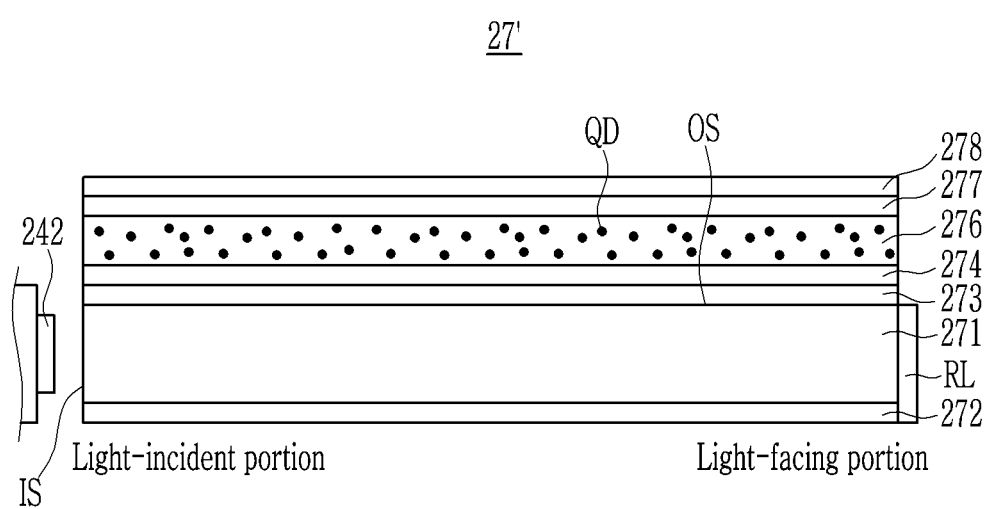
FIG. 5 illustrates a cross-sectional view of an optical member according to an embodiment.

FIG. 5 shows a cross-sectional view of an optical member 27' according to an embodiment. Some features of the optical member 27' may be analogous to or identical to some features of the optical member 27 described above. The optical member 27' of FIG. 5 will be described with a focus on differences from the optical member 27 of FIG. 3.

The optical member 27' of FIG. 5 differs from the optical member 27 of FIG. 3 in that it does not include the first capping layer 275. In the optical member 27', the wavelength conversion layer 276 is directly disposed on the blocking layer 274, and an upper surface of the blocking layer 274 is in direct contact with a lower surface of the wavelength conversion layer 276. In embodiments, the blocking layer 274, which may be formed of a metal oxide, may function as a capping layer to prevent organic material of the wavelength conversion layer 276 from mixing with organic material of the low refractive index layer 273.

Figure 6:
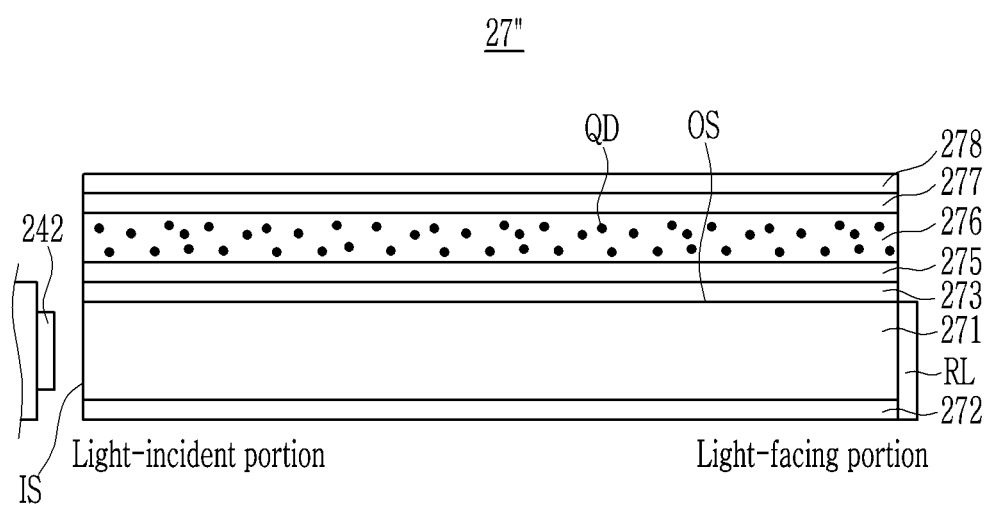
FIG. 6 illustrates a cross-sectional view of an optical member according to an embodiment.
Figure 7:
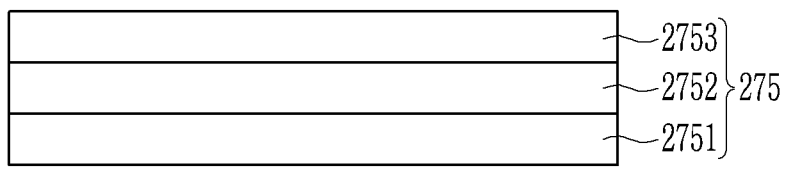
FIG. 7 illustrates a cross-sectional view of a first capping layer shown in FIG. 6 according to an embodiment.
Figure 8:
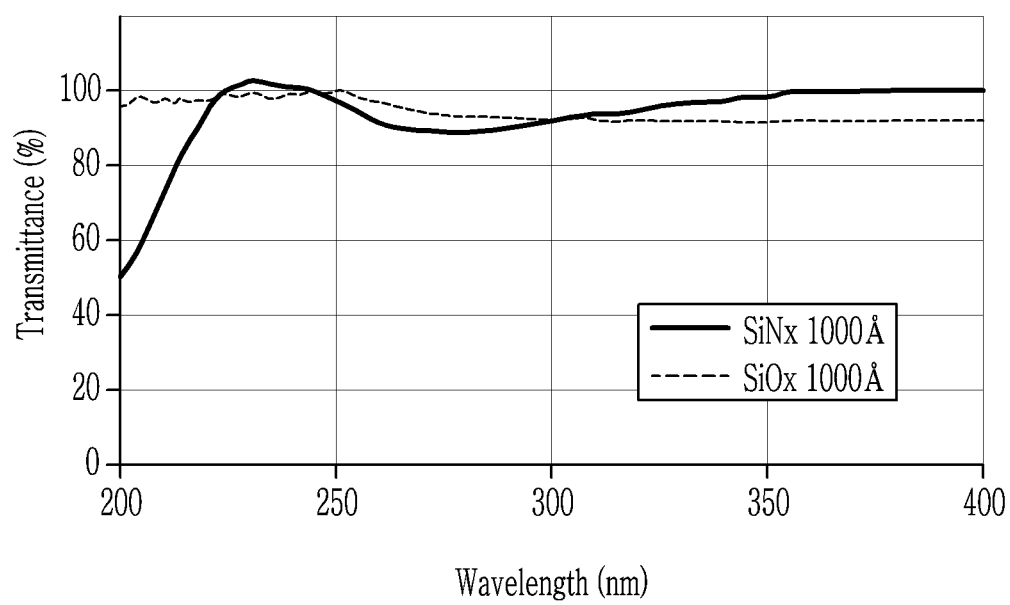
FIG. 8 illustrates a graph of transmittance values of a silicon nitride layer and a silicon oxide layer according to an embodiment.

FIG. 6 illustrates a cross-sectional view of an optical member according to an embodiment, FIG. 7 illustrates a cross-sectional view of a first capping layer shown in FIG. 6, and FIG. 8 illustrates a graph of transmittance values of a silicon nitride layer and a silicon oxide layer. Some features of the optical member 27" may be analogous to or identical to some features of the optical member 27 and/or the optical member 27' described above.

The optical member 27" may effectively block ultraviolet rays from entering the light guide plate 271 without including the blocking layer 274 described above. The optical member 27" includes a light guide plate 271 includes a low refractive index layer 273, a first capping layer 275, a wavelength conversion layer 276, a second capping layer 277, and an overcoat layer 278 that are sequentially stacked on the light guide plate 271, and includes a pattern sheet 272 that is disposed under the light guide plate 271.

The first capping layer 275 includes a plurality of layers 2751, 2752, and 2753; the first layer 2751 may be the lowest layer of the plurality of layers and may include or may be formed of a silicon nitride. Each of the second layer 2752 and the third layer 2753 may include or may be formed of a silicon nitride, or may include or may be formed of an inorganic material, such as a silicon oxide, different from the silicon nitride. The first capping layer 275 may be formed through a plasma chemical vapor deposition method. Although the plasma CVD method may incur ultraviolet rays, when the first layer 2751, which is a silicon nitride layer, is formed to have a predetermined thickness or more, short wavelength transmittance of the silicon nitride layer decreases. When the second layer 2752 and the third layer 2753 are subsequently formed, ultraviolet rays may be blocked by at least the first layer 2751 of the first capping layer 275. FIG. 8 shows transmittance graphs of a silicon nitride layer and a silicon oxide layer of 1000 Å. Although the silicon oxide layer has high transmittance as a whole in an ultraviolet region, the transmittance of the silicon nitride layer is drastically reduced at a wavelength smaller than about 220 nm, and the silicon nitride layer has transmittance of about 50% at a wavelength of 200 nm. Ultraviolet rays may significantly and undesirably influence the light guide plate 271 (for example, lowering the transparency for blue light due to the phase change of impurities). In embodiments, the silicon nitride layer(s) may sufficiently block ultraviolet rays, such that potential deterioration of the optical characteristics of the light guide plate 271 may be minimized or prevented.

Since ultraviolet rays may occur in the plasma chemical vapor deposition for formation of the first layer 2751 before sufficient thickness of the silicon nitride layer for blocking the ultraviolet rays is formed, the light guide plate 271 may be potentially affected. In embodiments, when the first layer 2751 is formed, by decreasing a power density (for example, to less than about 0.17 W/cm$^2$) of the deposition process, it is possible to minimize ultraviolet rays and therefore minimize undesirable change of the light guide plate 271. Subsequently, by increasing the power density of a deposition process for forming each of the second layer 2752 and the third layer 2753, it is possible to reduce total deposition time. As a result, even if both the first layer 2751 and the second layer 2752 are formed of a silicon nitride, film qualities of the first layer 2751 and the second layer 2752 are different: the first layer 2751 is denser than the second layer 2752, thus an interface between the first layer 2751 and the second layer 2752 may be formed. Although three layers 2751, 2752, and 2753 are illustrated as the plurality of layers of the first capping layer 275, the first capping layer 275 may include two layers or more layers.

The change of the optical characteristics of the light guide plate 271 (transparency decrease) may be a result of a plasma chemical vapor deposition process. If the first capping layer 275 is formed using atomic layer deposition (ALD) or another vapor deposition method involving no plasma, the blocking layer 274 for preventing the optical characteristics of the light guide plate 271 from changing may not be necessary. In embodiments, in addition to or alternative to a silicon nitride and/or a silicon oxide, the first capping layer 275 may be formed of an inorganic material such as an aluminum oxide (AlO$_x$) and/or a zirconium oxide (ZrO$_x$) with high transmittance in the visible light region. An optical member in which the first capping layer 275 is formed by an atomic layer deposition method may not include a blocking layer 274 and may have a stacked structure shown in FIG. 6.

Figure 9:
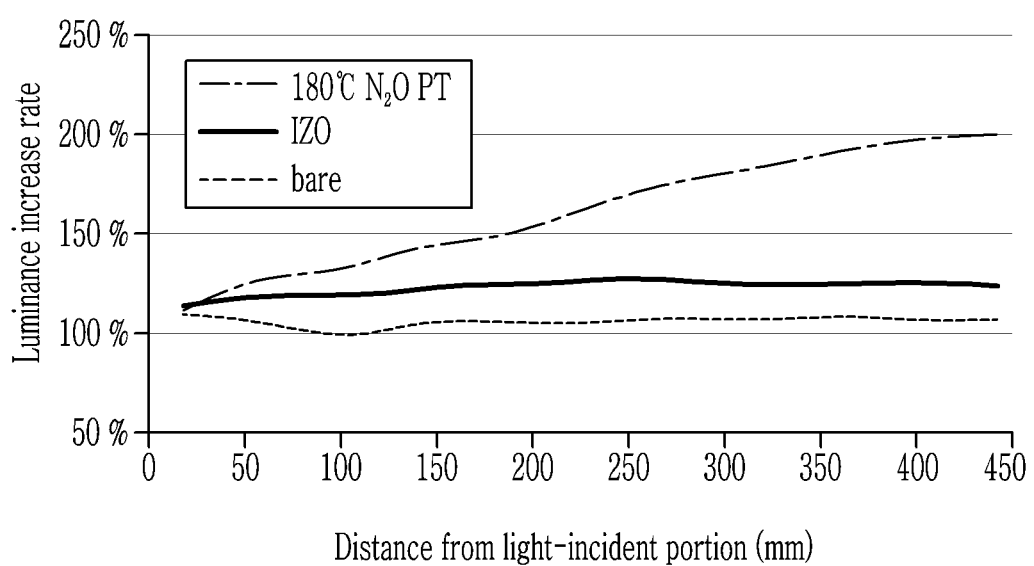
FIG. 9 illustrates a graph of a luminance increase rates of an optical member including a blocking layer according to an embodiment and of an optical member not including a blocking layer according to an embodiment.

FIG. 9 illustrates a graph of luminance increase rates of an optical member including a blocking layer according to an embodiment and of an optical member not including the blocking layer according to an embodiment.

A curve (an embodiment) indicated by a solid line in FIG. 9 shows luminance increase rates of an optical member treated with N$_2$O plasma at 180° C. after a blocking layer is formed of an indium-zinc oxide (IZO) on the light guide plate, and a curve (a comparative example) indicated by a one-dot chain line (or dash-dotted line) in FIG. 9 shows luminance increase rates of the optical member treated with N$_2$O plasma at 180° C. without forming a blocking layer on the light guide plate. A curve indicated by a dotted line is a reference example showing luminance increase rates of a light guide plate in a bare glass state. The luminance increase rates were evaluated by comparing the luminance values initially measured and the luminance values measured after driving the manufactured optical member in combination with the LED light source for a predetermined time period.

Referring to FIG. 9, as a distance from the light-incident portion increases, the luminance increase rate of the optical member that does not include a blocking layer substantially linearly increases, and the luminance of the farthest light-facing portion from the light-incident portion increases to about 200%. In contrast, the luminance of the optical member including the blocking layer slightly increases generally, but the luminance increase of the light-facing portion is not remarkable, and substantially no change in luminance is observed. Therefore, it can be confirmed that the blocking layer of the optical member may minimize or prevent change of the luminance of the optical member.

While example embodiments have been described, practical embodiments are not limited to the described embodiments. Practical embodiments are intended to cover various modifications and equivalent arrangements within the scope of the appended claims.

What is claimed is:
1. A backlight unit comprising:
a light source;
a light guide plate neighboring the light source;
a low refractive index layer disposed on the light guide plate, wherein a refractive index of the low refractive index layer is less than a refractive index of the light guide plate;
a wavelength conversion layer including quantum dots; and
a first capping layer disposed between the low refractive index layer and the wavelength conversion layer, comprising a first sublayer, and comprising a second sublayer,
wherein both the first sublayer and the second sublayer are formed of a first material, and
wherein the first sublayer directly contacts the second sublayer, is denser than the second sublayer, and is disposed between the low refractive index layer and the second sublayer.
2. The backlight unit of claim 1, further comprising: a blocking layer disposed on the low refractive index layer, wherein
maximum transmittance of the blocking layer with respect to UV-B and UV-C is less than or equal to 40%.
3. The backlight unit of claim 1, further comprising: a blocking layer disposed on the low refractive index layer, wherein
maximum transmittance of the blocking layer for UV-C is less than or equal to 20%.
4. The backlight unit of claim 1, further comprising: a blocking layer disposed on the low refractive index layer, wherein
the blocking layer includes a metal oxide.
5. The backlight unit of claim 4, wherein
the metal oxide includes at least one of an indium oxide, a zinc oxide, a zirconium oxide, an indium-zinc oxide, an indium-tin oxide, an indium-gallium-zinc oxide, an indium-tin-zinc oxide, and indium-tin-gallium-zinc oxide.
6. The backlight unit of claim 1, further comprising: a blocking layer disposed on the low refractive index layer, wherein
minimum transmittance of the blocking layer is at least 70% for blue light having a wavelength in a range of 440 nm to 485 nm.
7. The backlight unit of claim 1, further comprising: a blocking layer disposed on the low refractive index layer, wherein
transmittance of the blocking layer is at least 80% for light having a wavelength of 447 nm.
8. The backlight unit of claim 1,
wherein the first material is a first inorganic material.
9. The backlight unit of claim 8, further comprising:
a second capping layer, wherein the wavelength conversion layer is disposed between the first capping layer and the second capping layer, and the second capping layer includes at least one of the first inorganic material and a second inorganic material.

10. The backlight unit of claim 9, further comprising:
an overcoat layer disposed on the second capping layer, wherein the overcoat layer includes an organic material.

11. The backlight unit of claim 7, wherein
the first sublayer is disposed between the second sublayer and the blocking layer.

12. A backlight unit comprising:
a light source;
a light guide plate neighboring the light source;
a low refractive index layer disposed on the light guide plate, wherein a refractive index of the low refractive index layer is less than a refractive index of the light guide plate;
a first capping layer disposed on the low refractive index layer and comprising a first silicon nitride layer; and
a wavelength conversion layer disposed directly on a silicon nitride surface of the first capping layer and including quantum dots; wherein the first capping layer further comprises a second silicon nitride layer overlapping the first silicon nitride layer, the first silicon nitride layer is denser than the second silicon nitride layer, directly contacts the second silicon nitride layer, and is disposed between the light guide plate and the second silicon nitride layer.

13. The backlight unit of claim 12, wherein
the first capping layer further comprising a material layer formed of a material different from silicon nitride.

14. The backlight unit of claim 12, wherein
the low refractive index layer and the wavelength conversion layer each include an organic material, and the first capping layer includes an inorganic material.

15. An optical member comprising:
a glass light guide plate;
a low refractive index layer disposed on the glass light guide plate, wherein a refractive index of the low refractive index layer is lower than a refractive index of the glass light guide plate;
a transparent conductive oxide layer disposed on the low refractive index layer,
a wavelength conversion layer disposed on the transparent conductive oxide layer and including quantum dots;
a silicon nitride layer disposed directly on the wavelength conversion layer, wherein the wavelength conversion layer is disposed between the glass light guide plate and the silicon nitride layer; and an inorganic material layer disposed between the transparent conductive oxide layer and the wavelength conversion layer, the inorganic material layer directly contacting the transparent conductive oxide layer.

* * * * *